Oct. 17, 1961     S. H. BEHR     3,005,150
APPARATUS FOR DETERMINING THE CONDITION
OF ELECTRICAL INSULATION
Filed Nov. 15, 1960     4 Sheets-Sheet 2

INVENTOR.
SAMUEL H. BEHR
BY
ATTORNEY

Fig. 6.

INVENTOR.
SAMUEL H. BEHR
BY
ATTORNEY

United States Patent Office 3,005,150
Patented Oct. 17, 1961

3,005,150
APPARATUS FOR DETERMINING THE CONDITION OF ELECTRICAL INSULATION
Samuel H. Behr, 1046 Pembroke St., Uniondale, N.Y.
Filed Nov. 15, 1960, Ser. No. 69,528
6 Claims. (Cl. 324—54)
(Granted under Title 35, U.S. Code (1952), sec. 266)

The invention described herein may be manufactured and used by or for the Government of the United States of America for governmental purposes without the payment of any royalties thereon or therefor.

This invention relates to the evaluation of the condition of insulation material that separates two conducting elements. The use of high voltage, direct current for such evaluation has long been recognized as having advantages over alternating current, especially for field testing equipment with a large capacitance, because the power requirements are less when direct current is used.

High potential alternating current subjects equipment to a serious risk of permanent damage. The destructive nature of the test with alternating current is further enhanced by the output capacity of the high potential equipment (usually 5 kva. or larger) necessary to supply capacitive current to the insulation under test. When a dielectric breakdown using alternating current voltage occurs the amount of current supplied by the test equipment is usually sufficient to cause burning and charring of and thus permanent damage to the insulation. The operator of such high potential prior test set has no advance warning before breakdown occurs and hence permanent damage to the insulation is usually inevitable. This alternating current method of insulation testing will not evaluate insulation condition but merely proves whether or not the insulation will withstand, without damaging breakdown, a rather arbitrary value of high voltage at the time of test. The present invention is contingent on the ionization voltage level of the dielectric material which decreases after long periods of aging.

Insulation resistance is a variable value that will change widely from day to day with change of ambient temperature and relative humidity. The indicated insulation resistance of identical dielectrics also is a function of the area of insulating material being measured. As an example, a cable 500 feet long measuring one megohm has a higher insulation resistance per unit length than a cable 10 feet long measuring 30 megohms. There are, therefore, no hard and fast rules concerning optimum values of insulation resistance, and at best the actual values are only relative. Insulation resistance will indicate the presence of moisture or conducting contaminants but will not show insulation condition. Insulation that is in poor condition, i.e. dried out and badly cracked will indicate high insulation resistance providing moisture or conducting contaminants are not present. Conversely, new insulation in good condition may indicate poor insulation resistance when exposed to high humidity or other moist environment. To clarify the term "insulation condition," this is considered to be the state of the insulation as to whether or not the dielectric is deteriorated physically by drying out because of natural aging or accelerated aging caused by excessive heat. Insulating materials in general contain minute fissures and voids. Natural aging of the insulation and accelerated aging caused by normal heat cycling or overheating causes, migration or loss of organic materials such as solvents, plasticizers, slipper compounds, etc. contained in composite insulations. This causes the formation of larger fissures and voids in the insulation. Vibration, shock, and thermal expansion and contraction of the conductor further tend to increase the number and size of these air voids in the insulation until visible cracking of the insulation occurs. The rate of deterioration before this end result occurs depends upon the type of service and environment the insulation is subjected to. It appears then, that if a method or instrument could determine the rate of increase of formation of these voids in the insulation, a reasonably accurate conclusion could be drawn concerning the degree of insulation deterioration and repairs or replacement could be made before electrical breakdown occurred. Deterioration rates can be accurately determined by measuring the stressing potential at which ionization of the air in the insulation voids occurs.

An object of this invention is to provide an improved method and apparatus for evaluating the condition of insulation material such as between two conducting elements, by the use of high voltage, direct currents impressed across such insulation, which will determine both the condition of the insulation, which will give improved and uniform accuracy in such evaluation, which will not result in damage to the insulation so tested or decrease its usefulness, which may be successfully and easily employed in the evaluation of insulation which is installed and hence may be largely inaccessible to the tester, which may be used successfully by persons who are not engineers or scientists, which permits rapid evaluation of the condition of the insulation, with which the application of the testing high voltage may be regulated manually or automatically, which employs apparatus that can be made compact and readily portable, which will be simple, accurate, convenient and practical, and which may be employed in determining the condition of the insulation of a cable that is largely inaccessible.

Another object of the invention is to provide improved circuitry and instrumentation for the evaluation of the condition of insulating material by the use of high voltage direct current, and which will be sufficiently compact and simple as to be readily portable to installations where the insulation to be tested cannot well be removed from its position of use, and which will not decrease the effectiveness or usefulness of the tested insulation.

Other objects and advantages will be apparent from the following description of apparatus constituting one embodiment of the invention, and the novel features will be particularly pointed out hereinafter in connection with the appended claims.

In the accompanying drawings.

Figure 5:
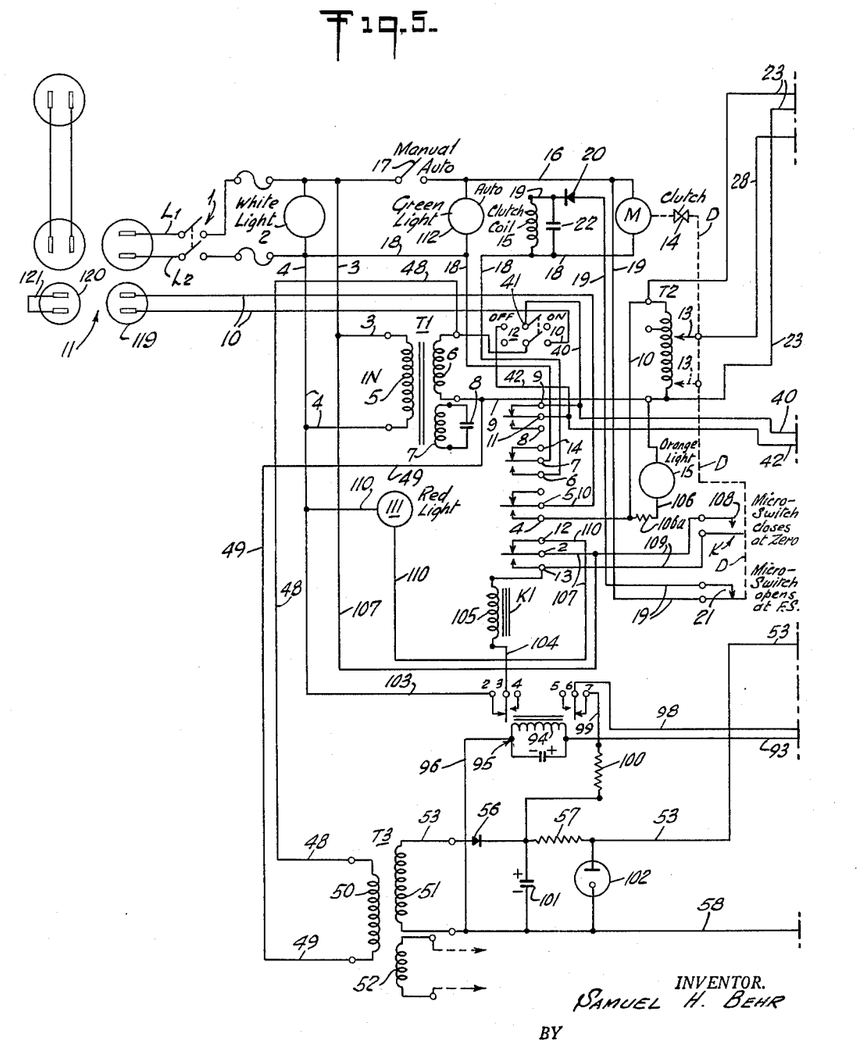
FIG. 5 is a circuit diagram of one part of an apparatus embodying this invention.
Figure 6:
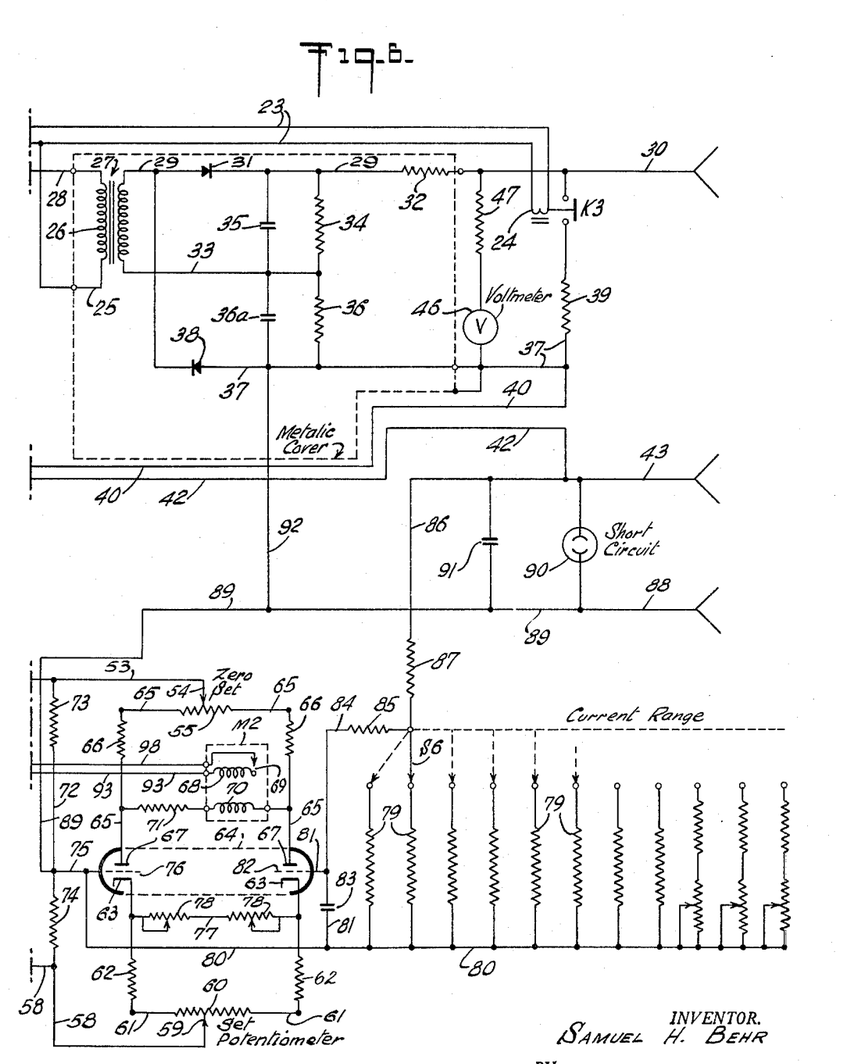
FIG. 6 is a circuit diagram of the balance of such apparatus, the circuit diagrams being complementary when placed side by side, with FIG. 5 at the left of FIG. 6.

In the illustrated example of the invention, and referring first to FIGS. 5 and 6 which represent complementary parts fo the circuitry and apparatus employed, and placing FIGS. 5 and 6 side by side with FIG. 5 at the left, the complete circuitry of the illustrated example may be followed. In FIG. 5, line wires L1 and L2 have leads for connection to a suitable source of alternating current, such as one delivering 110–120 volts, 60 cycle current. A main switch 1 in these line wires serves to connect this source of current to the testing apparatus. An electric light 2 is connected across wires L1 and L2, under control of the switch 1 to indicate, when it is illuminated, that the power is on. Wires L1 and L2 are connected by wires 3 and 4 to the terminals of the primary winding 5 of a transformer T1 serving as a voltage regulator. There are two secondary windings 6 and 7 of this transformer, the circuit of winding 7 being closed through a condenser 8. This winding 7 and condenser 8 smooth out any surges in the line voltage and thus insure an even voltage of the current induced in winding 6. This winding 6 is connected by wires 9 and 10 to the end terminals of a single winding, variable voltage control transformer T2, and the wire 10 includes in series therein a remote safety switch 11, normally open contacts 4 and 5 of a normally deenergized, high voltage relay K1, and one side of a double throw, dipolar switch 12.

The transformer T2 has a tap or contact 13 which is mounted for movement in a direction lengthwise along the transformer winding so as to vary the proportions of the transformer winding between the tap and the ends of the winding at any time. This tap contact 13 is mechanically moved along the winding of T2 by a motor M operating through a clutch 14 that is operated into coupled condition by the clutch coil 15, and spring biased to open or uncoupled condition. One terminal of the motor M is connected by wire 16 to one terminal of a manually operable switch 17, the other terminal of which is connected to line wire L1. The other terminal of motor M is connected by wire 18 to line wire L2 but it includes in series therein the normaly open contacts 6 and 7 of relay K1.

One terminal of clutch operating coil 15 is connected to wire 18 between the contacts of relay K1 and the motor M. The other terminal of clutch operating coil 15 is connected by a wire 19, having in series therein a rectifier 20, to the motor wire 16, but in series in wire 19 is a microswitch 21 that is mechanically opened by the motor through the clutch by the means that operates the tap contact 13 along the winding of transformer T2. The switch 21 is normally closed, but it is opened by the motor when the tap is at about the final turn at one end of the winding of transformer T2. This is a safety feature by which the clutch is caused to open and prevent overrunning of the tap contact 13. A condenser 22 is connected in shunt across clutch winding 15 to flatten out any pulses of current in the clutch winding, which prevents chattering of the clutch. The rectifier is used because a direct current gives better results in the operation of the clutch.

The end terminals of the winding of transformer T2 are connected together by a wire 23 having in series therein a winding 24 of safety relay K3. Relay K3 normally closes its contacts under a suitable bias when its winding 24 is deenergized, and serves as a safety relay to drain off any potential charge remaining between conductors spaced by the insulation under test, as will be explained later herein. The wire 23 is also connected by wire 25 (FIG. 6) to one terminal of the primary winding 26 of a voltage step up transformer 27, the other terminal of that primary winding being connected by wire 28 to the adjustable tap 13 of transformer T2 (FIG. 5). One terminal of the secondary winding of transformer 27 is connected by wire 29 to a terminal 30 that is formed for connection to one of the conducting elements of the test specimen. This wire 29 has successively in series therein, in a direction away from transformer 27, a rectifier 31 passing direct current only to the terminal 30 and preventing return current flow, and then a current limiting resistor 32 which prevents danger of damage to the test apparatus if the specimen under test should happen to have its conducting elements short circuited.

The other terminal of the secondary winding of transformer 27 is connected by wire 33 and resistor 34 to wire 29 between rectifier 31 and resistor 32. A condenser 35 is connected in shunt across resistor 34. Wire 33 is also connected through a resistor 36 to a wire 37 that is connected through a rectifier 38 to wire 29 between the secondary winding of transformer 27 and the rectifier 31. The rectifier 38 passes current only toward wire 29. A condenser 36a is connected in shunt across resistor 36. The other end of wire 37 is connected through a voltage draining resistor 39 to one contact of the switch of relay K3, the other contact of the switch of relay K3 being connected to wire 30. Wire 37, between rectifier 38 and resistor 39, is connected by wire 40 to a center contact of switch 12. One terminal at the off side of switch 12, with which movable switch bar 41 may engage and establish connection between it and wire 40, is connected by wire 42 to a connector lead 43 which is formed at its free end for detachable connection to another conducting element of the test specimen.

Branch wires 44 and 45 (FIG. 5) connect wires 40 and 42, respectively, to contacts 9 and 11 of relay K1. A high voltage kilo-voltmeter 46 having a linear scale is connected between wire 29 between resistor 32 and terminal 30 and wire 37 between rectifier 38 and resistor 39 to measure the voltage across those connections. The condensers 35 and resistor 34 and the condenser 36a and resistor 36 serve as filters for the high voltage direct current output.

Referring again to FIG. 5, the terminals of secondary winding 6 of transformer T1 are connected by wires 48 and 49 to the ends of a primary winding 50 of a power supply transformer T3. There are two secondary windings 51 and 52 of this transformer T3. One end of winding 51 is connected by wire 53 to a slidable tap 54 (FIG. 6) of a zero set potentiometer 55, but it includes in series therein, beginning with winding 51, a rectifier 56 and a limiting resistor 57. The other terminal of winding 51 is connected by a wire 58 to the slidable tap 59 of a set potentiometer 60. The ends of set potentiometer 60 are connected by wires 61, each having a resistor 62 in series therein, to cathodes 63 of a twin triode tube 64. The ends of zero potentiometer 55 are connected by wires 65, each having a resistor 66 in series therein, to the plates 67 of the vacuum tube 64.

Figure 4:
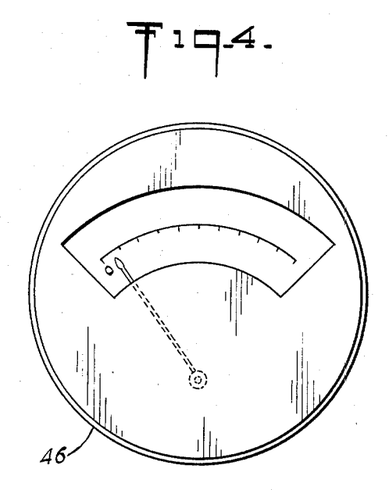
FIG. 4 is a schematic view illustrating one example of the face of a microammeter forming a part of the apparatus embodying this invention.

A microammeter M2 is provided with a holding relay having a holding coil 68 and a limit switch 69 in series with coil 68 that is closed when the holding coil 68 is energized. The microammeter also has a current measuring coil 70 which is connected at its ends to the wires 65 between the resistors 66 and the plates 67, but with a calibrating resistor 71 in series with the coil 70. It also has an indicator hand 70a (FIG. 4) operating over a scale dial 70b under the action of coil 70, and a reference set mark 70c on the dial.

The adjustable tap 54 of the zero adjustment potentiometer 55 is connected through the adjacent end of wire 53 and a wire 72 to wire 58 near the adjustable tap 59. Wire 72 has two resistors 73 and 74 in series therein and in series with each other. The wire 72 at a point between the resistors 73 and 74 is connected by a wire 75 to the control grid 76 of the adjacent triode of vacuum tube 64. The cathodes of tube 64 are also connected to each other by wire 77 having in series therein and with each other two adjustable balancing resistors 78 that balance the circuits through the two triodes. One resistor 78 is of much smaller resistance than the other. Once they have been set, no change is required during the operation of the device.

The microammeter has associated therewith a group or plurality of resistances 79 which are of progressively increasing resistance, beginning for example, with a value of 2,000 ohms at one end of the group and increasing in steps to 5,000 ohms, 10,000 ohms, 50,000 ohms, through about eleven steps or ranges, so as to make the sensitivity of the microammeter circuit, at full scale, vary from about 5,000 microamperes to 2 microamperes. All of these current range, parallel resistances 79 are connected at corresponding ends to a common wire 80 which in turn is connected to the wire 75 that leads to the control grid 76 of one triode part of tube 64. A branch wire 81 connects wire 80 to the control grid 82 of the other triode part of tube 64, but branch wire 81 has a condenser 83 in series therein. The control grid 82 is directly connected through a part of wire 81 and a wire 84 to a movable contact S6 which is shiftable along the current range resistors 79 to make connections in sequence with the other ends of those resistors. A resistor 85 is connected in series in the wire 84.

The contact S6 is also connected by a wire 86 to the wire 42 and connector 43, but a resistor 87 is included in series with wire 86. A third terminal 88 is formed at one end for connection to a shield on a cable under test, and at its other end it is connected by a wire 89 to wire 75 that leads to the control grid 76 of one triode in tube 64. A neon light 90 is connected across terminals 43 and 88 to indicate if a short circuit through the insulation under test exists in a test specimen. A condenser 91 is connected in shunt across the neon light 90. A branch wire 92 connects wire 89 to wire 37 between rectifier 38 and voltage draining resistor 39.

The holding coil 68 of the microammeter is connected by wire 93 to one end of the winding 94 of a control relay 95 (FIG. 5), the other end of winding 94 being connected by a wire 96 and part of wire 58 to an end of secondary winding 51 of the power supply transformer T3. A condenser 97 is connected in shunt across the relay winding 94. The other end of holding coil 68 at the microammeter is connected through contacts 69 that are biased to open position when coil 68 is deenergized, and wire 98 to contact 6 of relay 95. Contact 6 of relay 95 is biased to closed position, when relay winding 94 is deenergized, with contact 7 of that relay, and that contact 7 is connected by wire 99, with a resistor 100 in series in that wire, to wire 53 between the limiting resistor 57 and the rectifier 56. A condenser 101 is connected between wire 53 at a point between limiting resistor 57 and rectifier 56, and wire 58, and this condenser 101 and limiting resistor 57 together form a filter. A cold cathode tube 102 to stabilize the B+ D.C. voltage from winding 51 of transformer T3 is connected between wire 58 and wire 53 at a point between limiting resistor 57 and the adjustable tap 54 of the zero set potentiometer 55. The current from secondary winding 52 of power supply transformer T3 is connected to the usual heaters (not shown) that heat the two cathodes 63 of the tube 64.

The control relay 95 also has contacts 2 and 3 that are biased to closed position when winding or coil 94 is deenergized, and contact 2 of this relay is connected by wire 103 to wire 4 that leads to line wire L2. The other contact 3 of control relay 95 is connected by wire 104 to one end of the winding 105 of the relay K1. The other end of winding 105 of relay K1 is connected to contact 13 of that relay, and cooperating contact 2 of that relay is connected by wire 107 to wire 3 that leads directly to line wire L1. A microswitch 108 that is mechanically closed by manual operation when the contact 13 of voltage control transformer T2 is set at zero or starting position is connected by wire 109 in shunt across the contacts 2 and 13 of relay K1. Contact 12 of relay K1, which is normally closed wtih contact 2 of that relay when the latter is deenergized, is connected by wire 110 to wire 103, and wire 110 has in series therein a red light 111 which is illuminated when a sudden increase occurs in the leakage current, through the insulation under test, between the terminals 30 and 43.

Contacts 6 and 7, of relay K1, which are biased to open position when winding 105 of relay K1 is deenergized, are connected in series in wire 18. Contacts 9 and 11, which are biased to closed position when winding 105 of relay K1 is deenergized, are connected respectively to wires 40 and 42. A green light 112 is connected between wire 16, at a point between switch 17 and motor M, and wire 18 at a point between line wire L2 and contact 7 of relay K1 to indicate by its illumination when the switch 17 is set or closed to automatic position that makes possible the operation of motor M. An orange light 15 is connected by wire 106 and part of wire 10 across the ends of the winding of variable voltage control transformer T2, and wire 106 has a resistor 106a in series therein. This light 15 glows when power is applied to the transformer T2 with consequent application of high voltage to the terminals 30 and 43.

Figure 1:
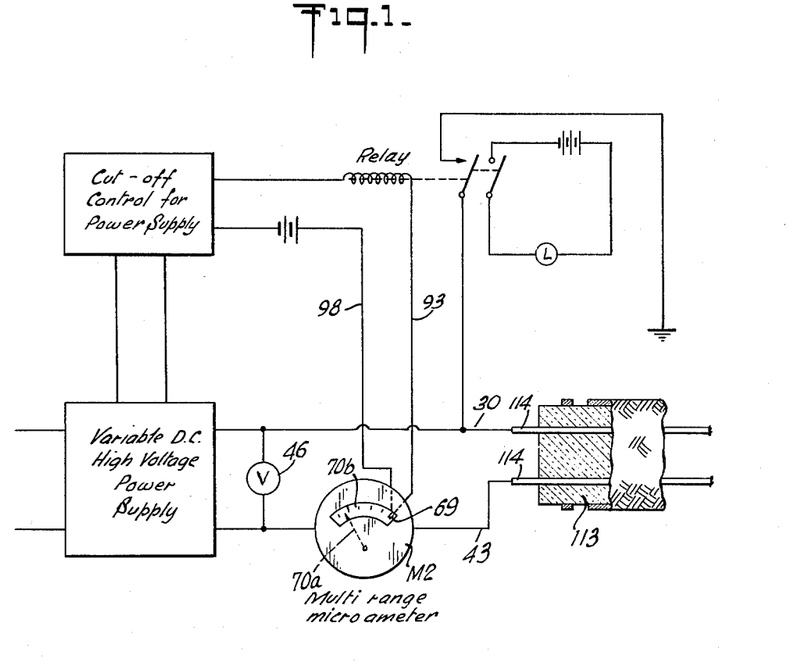
FIG. 1 is a schematic block diagram illustrating the basic principle of this invention and the general arrangement of various parts of apparatus embodying the invention.

The general arrangement of the various parts of the apparatus is illustrated by the block diagram of FIG. 1. The testing of insulation, in situ, wherever it occurs is possible, and it is unnecessary to remove it from the place where it is installed or to convey it to a laboratory for testing. The insulation may be that in a cable which separates a plurality of conductors, or it may be the insulation between adjacent conductors in a winding of some kind, or between an insulated conductor of a winding and a metal frame on which the insulated conductor is mounted. These are only a few of the many possible applications of the improved method and apparatus. FIG. 1 illustrates the application of this invention to the testing of the insulation 113 separating a plurality of electrical conductors or wires 114 in a common multi-wire cable.

To test the insulation in this cable, the terminal 30 (FIG. 6) is connected, such as by a spring clamp, to one of the conductors 114 (FIG. 1), and the other terminal 43 is similarly connected to the other conductor 114. The leakage current through the insulation under slowly and uniformly increasing D.C. voltages is then measured in accordance with this invention, which will indicate how high a voltage the insulation will take before the air in the voids of the insulation ionize and provides the knee in the graph of current vs. voltage. The condition can be determined before any damage is done to the insulation being tested. The first test is usually by applying slowly and uniformly the high D.C. voltage to the conductors 114, one at a time, such as starting with an initial D.C. voltage of 1,000 volts, and the low voltage connector is connected to the armor and the other conductor for those tests. The next test usually is to apply the high voltage to the two conductors 114 together, with the low voltage connector 43 connected to the armor on the cable. It is advisable at the start of each such test to connect terminal 88 to the shield 118 and wire 43 to armor 115 and the conductor 30 to one of the conductors 114. If there should be a short circuit or ground between the conductors under test and the armor, the light 90 would glow and indicate that condition, and damage to the apparatus is avoided. If a specimen with a short creepage distance is being tested, shield 118 will prevent leakage from the armor to the conductors 114.

The remote control switch 11 can be an ordinary switch on the end of a long cable having therein the wires 10, or as shown, wires 10 can be connected to the terminals of an ordinary electrical plug socket 119, and an ordinary two prong plug 120, with its terminals connected together by a wire 121, when operatively coupled to the socket will connect the wires 10 and thus act as a manually operated switch. This makes it possible to prevent inadvertent operation of the testing apparatus, with the necessary application of a very high voltage to the conductor of a cable, when a person may be examining the cable or handling it in a room remote from the testing apparatus. Such person must connect the wires 10 when it is safe to proceed with the testing operation before anyone can start the testing operation. Connecting the wires 10 at the remote switch enables power to be applied to the winding of voltage control transformer T2, which is necessary before high voltage can be applied to the cable or object under test.

In the operation of the illustrated apparatus representing one embodiment of the invention, let it first be assumed that manual operation of the adjustable contact 13 is to be employed. The terminals 30 and 43 are connected to the specimen under test. The operator closes power switch 1 which supplies operating power to the apparatus, and immediately white light 2 will glow to indicate that the power is on and that the circuit is closed through the primary winding of transformer T1. The switch 17 is open and indicates that the apparatus is set for manual operation of contact 13 of transformer T2. The contact 13 was set at zero, the lowest possible position in FIG. 5, before the power was turned on. This manual setting of contact 13 is possible because the clutch 14 disconnects the motor from the means, indicated schematically by the dash line D in FIG. 5, by which the motor operates the contact 13 when the motor operation is desired. When power was applied to transformer T1 a circuit was established from line wire L1, through wires 3, 107 and 109, microswitch 108, winding 105 of relay K1, wire 104, contacts 2 and 3 of relay 95, and wires 103 and 4 to line wire L1. Microswitch 108 was previously closed by the manual setting of contact 13 of transformer T2 at start or zero position. Relay K1 is now energized.

Since transformer T1 was made active by the closing of main switch 1, the secondary of that transformer is delivering current to the primary of transformer T3. Secondary winding 52 of transformer T3 supplies heat to the cathode 63 of vacuum tube 64 and winding 51 and rectifier 56 supply B+ voltage for the vacuum tube ammeter circuits. After the vacuum tube circuits warm up, one adjusts the tap 54 of zero potentiometer 55 until the movable indicator 70a (FIG. 4) in the microammeter, which is actuated by the magnetic pull of coil 70, reads zero on the dial of the microammeter.

The high voltage switch 12 is closed to connect the secondary winding of transformer T1 through safety, remote control switch 11, contacts 4 and 5 of relay K1, since relay K1 has been energized, to one side of variable voltage control transformer T2, through the winding of T2, to the other terminal of the secondary winding 6 of transformer T1. The winding of T2 is now energized, which is indicated by the lighting of orange light 15.

The tap 13 is moved far enough to cause application of a substantial voltage across the insulation, large enough to produce some appreciable and measurable leakage current through the insulation. One then adjusts the tap 59 of the set potentiometer 60 to cause the current measuring indicator 70a to take a selected position along the scale a small distance away from zero and representing that fraction of the possible movement of indicator 70a from zero scale position to the limit switch, which corresponds to an equivalent fraction of the possible movement of the voltmeter indicator over one of its scales, which the voltmeter indicator has moved over to indicate the present voltage across the insulation that has induced such leakage current. In connection with the manual operation of the tap 13 that varies the applied voltage, one may, if desired, omit the step of first adjusting the tap 59 of the set potentiometer 60 until the current indicator takes a selected position away from zero, and in such a case one reads the leakage currents and applied voltage directly. Otherwise, one would watch for abnormal proportional movements of the leakage current indicator for each proportional increase in applied voltage.

One next manually moves the tap 13 slowly along the winding of T2 by small uniform units or increments, with intervals of rest between the increments. This supplies increasingly larger direct current voltages upon transformer 27 which is stepped up thereby to the high voltages applied to the test specimen. This slow increase in applied voltage is to keep the capacitive charging current through the insulation to a negligible value so as not to destroy the desired linear charge in the leakage current. One observes or reads the voltmeter 46 and the microammeter during the rest interval after each uniform unit or increment of movement of the tap or contact 13 and may record those readings. When the microammeter indicator denotes a sudden, non-proportional, unusual and substantial abnormal rise in leakage current occurring after one of such successive uniform units or increments of rise of voltage applies to the specimen, the last indicated voltage that was applied to the specimen before the unusual or non-proportional rise in leakage current indicates the present condition of such insulation. The D.C. voltage which was applied to the test specimen, was that which was rectified by rectifiers 31 and 38 and filtered by resistors 34 and 36 and condensers 35 and 36a.

The terminal 30 is preferably applied to the high side of the test specimen, such as to the conductor of a cable if a cable is being tested. The low side of the test specimen is connected, by terminal 43, to and through the current range resistors 79. As the adjustable contact 13 of transformer T2 is adjusted by small increments of increase in voltage, after each increment of voltage increase, the contact S6 is adjusted along the current range resistors to bring the leakage current into microamperes in a range that can be read on the microammeter. Upon the sudden and abnormal increase in the leakage current during the increments of increased voltage applied to the test specimen, the microammeter indicator or movable member 70a (FIG. 4) will move across the dial and close switch 69. This closing of switch 69 will complete a circuit through the relay 95, whereupon this energized relay opens its normally closed contacts 2—3 and 6—7, which respectively deenergizes the coil 105 of relay K1 and opens the holding circuit at contacts 6 and 7 through the holding coil 68. When relay K1 was deenergized by separation of contacts 2 and 3 of relay 95, contacts 4 and 5 of relay K1 also were opened by an existing bias, which broke the circuit to the variable voltage control transformer T2. This removed the high voltage from the specimen, and current through coil 70 of the microammeter dropped to zero. The condenser across the coil 94 of relay 95 helps eliminate any chatter of the contacts of that relay 95 which might otherwise occur, and causes that relay to hesitate a fraction of a second after the voltage thereon is removed.

In the automatic operation of the apparatus, the power supply is applied by operation of the main switch 1, but switch 17 is still open. The tap 13 of transformer T2 is placed at the bottom (FIG. 5) or start position (shown by dash lines), from which it is gradually and slowly moved manually along the winding of T2 until the voltmeter 46 reads some selected voltage such as 2000 volts and sufficient to cause a small but measurable leakage current to pass through the insulation. The current range selector tap or contact S6 is then moved to the lowest range at which the movable indicator of microammeter 70 just passes a set mark 70c on the scale of that ammeter, which set mark is preferably about 10% along the full scale 70b of the ammeter. Microammeters are well known, and hence all of the construction details thereof are not illustrated. One next adjusts the tap 59 on the set potentiometer 60 until the indicator 70a of the ammeter, operated by coil 70, is aligned with the set position 70c on the ammeter. The indicator 70a is adjusted in the same manner explained above preparatory to manual operation. The switch 17 is then closed to the autoposition whereupon the motor M starts operating and clutch 14 couples the motor to the drive mechanism that slowly moves tap or contact 13 along the coil of the voltage regulator transformer T2. This causes a very slow increase in the high voltage applied to the test specimen.

During this increase in the applied high voltage, the microammeter will indicate a slow increase in the leakage current at an approximately linear rate directly proportional to the applied voltage until there is a sudden and abnormal increase in the leakage current. When this occurs the indicator 70a of the microammeter swings to the right and closes contacts 69 to interrupt the operation. An observation of the voltmeter will enable one to know the voltage at which the sudden current increases or "knee action" occurred. When the contacts 69 were closed, the "knee action" light 111 was lighted to indicate that the abnormal increase in leakage current had occurred at the same time that the high voltage is cut off from the test specimen. When the high voltage is so cut off from the test specimen, relay 24 is operated to dissipate any charge remaining on the test specimen by closing a circuit through the draining resistor 39. This makes it safe for one then to touch the specimen without danger of receiving a shock from the charge on the specimen, since the conductors and insulation of the specimen act as a condenser to store a voltage charge impressed thereon by the application of the high voltage.

When the relay K1 was deenergized, its contacts 6 and 7 were opened by a bias on contact 7, and this stopped operation of the motor and caused an uncoupling of the clutch. The limit switch 21 which also controls the motor and clutch is disposed for operation to open position by the motor when the limit of movement of tab or contact 13 along the winding of transformer T2 has occurred. This is a safety feature which becomes effective if no automatic stoppage of the motor by the microammeter occurs before the maximum possible high voltage is applied to the test specimen.

In operation, the main switch 1 is left turned on, and this places power on transformers T1 and T3 so that current will pass to the microammeter amplifier to keep it warmed up with its cathodes 63 at operating temperatures. This makes it unnecessary to wait between tests while the microammeter amplifier warms up. The switch 12 is placed in its "off" position when the tester is temporarily inactive and keeps the high voltage inactive and the charge draining circuit through resistor 39 is closed. The switch 12 is operated to its "on" position when a test is to be started, and between tests it is placed in its "off" position where it shunts contacts 9 and 11 of relay K1 that are open when relay K1 is energized. The wire 37 is always connected to a metallic casing or shield, indicated by dash lines, in FIG. 6, around step-up transformer 27, rectifiers 31 and 38, condensers 35 and 36a and resistors 34 and 36.

Figure 2:
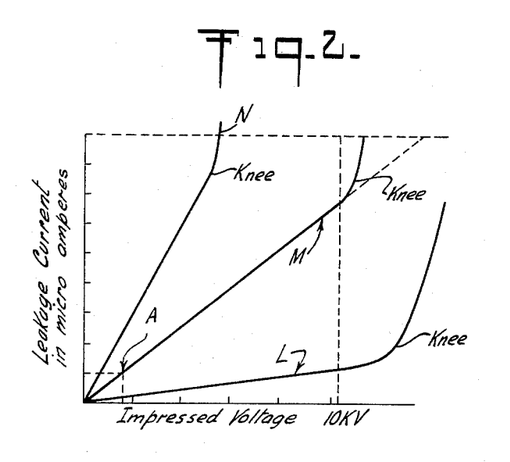
FIG. 2 is a graph illustrating leakage currents and certain advantages and details of this invention.
Figure 3:
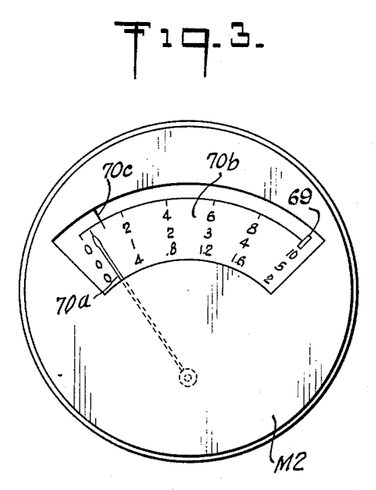
FIG. 3 is a schematic view illustrating one example of the face of a voltmeter that may be used.

Referring now to the graph in FIG. 2, the leakage current is plotted on the vertical ordinates and the impresed voltage is plotted on the abscissa ordinates. The sudden or abnormal or disproportional rise in leakage current occurs at the ionization voltage of the insulation, and the area on a graph line where this occurs is commonly called the "knee" of the graph line. Three of the many possible graphs are illustrated by the graph lines L, M and N. If the graph line N is employed it will be observed that the "knee" or area of the graph where the abnormal rise in leakage current occurs is not clearly defined, because the leakage current rise at the start of the "knee" is large for a small increase in impressed high voltage. If the graph line L is employed, the "knee" is also not clearly defined because at its start the current rise is small for large increases in the applied high voltage.

It is therefore advisable to employ a graph line which makes about a 45° angle to the ordinates until the "knee" is reached because in such a case the leakage current rise is about evenly and directly proportional to the increases in the applied high voltage. The milliammeter is therefore preset at the same position on the scale regardless of the actual numerical value of the leakage current in the insulation under test. This presetting is accomplished by applying a voltage to the insulation under test, of about 1000 volts to 2000 volts and adjusting the microammeter scale selector and vernier "set" control 59 so that the microammeter pointer 70a coincides with a set mark located usually at about 10% of the full voltage scale on the microammeter. This starts the graph M at this set mark A in FIG. 2, regardless of the magnitude of the leakage current. The applied high voltage on the insulation under test is preferably increased at the rate of approximately 1000 volts per minute. This slow rate of applied high voltage rise minimizes charging current and dielectric absorption effects of the insulation and results in a relatively straight line graph as shown by the line M in FIG. 2, providing that the insulation ionization voltage level has not been reached.

The set point on the microammeter scale should be near but spaced from the zero scale reading, and correspond to a point on a linear graph representing the relationship between leakage current and applied voltage, which graph if extended to the maximum possible voltage reading on the graph scale, would intersect the measured leakage current on the current ordinate through the maximum voltage scale slightly or somewhat below the maximum possible current indicating scale reading on the microammeter as it is plotted on the vertical ordinate. With such a graph line M, the "knee" of the graph line can be definitely determined following a small increment of rise of applied voltage on the insulation. With the microammeter so adjusted that the readings of applied voltage and leakage currents when plotted will provide a graph similar to M in FIG. 2, and the indicator 70a of the microammeter will not operate and close contacts 69 with the limit of expected applied voltages. If a knee occurs within the range of expected applied voltages, where the leakage current as measured is sufficient in magnitude to operate the contact making switch 69, the indicator will move rapidly over the scale and cause a closing of contacts 69 to indicate that the knee of the graph line has been reached.

The schematic block diagram of FIG. 1 is provided to illustrate as briefly and simply as possible some of the basic or fundamental principles employed in the invention, but the constructions illustrated in FIGS. 3 to 6 and described are explanatory of a commercial embodiment of the invention. To simplify and summarize the understanding of operation of an embodiment of this invention, we may assume an insulating material with negligible capacitance. If a low voltage is applied to the insulation and then increased at a slow uniform rate there will be a linear relationship between voltage and leakage current in accordance with Ohm's law. This relationship will exist until the stressing potential reaches a level that is high enough to ionize any air within fissures or voids in the insulation. When this occurs the air within the voids, which normally has high resistance, becomes conductive. This, in effect, by-passes some of the insulation thereby abruptly changing the overall resistance of the insulation. This causes a sudden rapid increase in leakage current through the insulation. A graph plotted to show this leakage current versus voltage relationship would start as a straight line and then show a sharp increase in leakage current as shown in FIGURE 2. This sudden rise in leakage current occurs at the ionization voltage of the insulation and the sudden change in direction of the graph is commonly called the "knee" of the graph or curve. Actual plots of leakage current in microamperes versus voltage can be made using an instrument as herein described and illustrated. Such instrument is preferably equipped with an ultra-sensitive vacuum tube powered microammeter such as one with eleven ranges. The range of its scales is from 2 microamperes full scale to 5000 microamperes full scale with an accuracy of 2%. A kilovoltmeter with a range of zero to 10 kv. (2% accuracy) indicates the voltage applied to the insulation.

The automatic operation of such an instrument when evaluating insulation condition is also contingent on the same ionization phenomena. The insulation leakage current for any one voltage will vary over a wide range and its magnitude depends upon many variables such as insulation thickness, area of insulation in contact with conductor, type of insulation, temperature of insulation, etc. To facilitate automatic operation of the instrument it is necessary to "preset" the microammeter at the same position on the scale regardless of the actual numerical value of leakage current in the insulation. This is accomplished by applying a voltage to the insulation being evaluated (1000 to 2000 volts) and adjusting the microammeter scale selector and vernier "set" control so that the microammeter pointer coincides with a "set" mark (which is colored red) located at say 10% of the full scale on the microammeter. This starts the data for the plot of the solid line at the point "A" on FIG. 2, regardless of the magnitude of leakage current. By switching on the motor drive on the variable voltage control the high voltage is increased at the rate of approximately 1000 volts per minute. This slow rate of voltage rise minimizes charging current and dielectric absorption effects of the insulation and results in a relatively straight line plot or graph as shown by the solid line M on FIG. 2, providing the insulation ionization voltage level has not been reached. If a "knee" in the curve should occur, the sudden and abnormal increase in leakage current for a uniform unit of increase in applied voltage will cause the contact making microammeter to operate its limit switch which in turn will remove the high voltage from the insulation. This operation will also light a knee indicator light which remains illuminated until the variable voltage control is returned manually to the zero voltage position. This automatic feature is exceptionally useful for organizations with preventive maintenance programs on their electrical equipment. The insulation condition can be evaluated periodically by non-technical personnel and a true indication of deterioration rate will result.

An example will show how a typical preventive maintenance evaluation is made on feeder cables. We will assume that the cables are rated at 600 volts. It is decided that the maximum direct current test voltage to be applied for insulation evaluation purposes is 5000 volts. The value of this maximum voltage is not critical but should be below the ionization voltage of a new piece of cable. Periodically the voltage is applied to each of the feeder cables to determine whether a knee occurs in the voltage versus leakage current curve. This is indicated by the knee indicator light and no graph plotting or data recording is necessary. We will now assume that the insulation condition test indicates a knee in the curve at 4500 volts after the cable has operated for several years. This is a first warning that the insulation is deteriorating. However, the insulation on a 600 volt cable with an ionization voltage of 4500 volts is still serviceable and should operate satisfactorily. When further periodic insulation evaluations are made on this cable it will be noted that the ionization voltage level (knee indication) will occure at lower voltages on each test as deterioration of the insulation continues. When the ionization voltage reaches a predetermined minimum safe operating level (such as 2500 volts in this instance) the cable should be replaced. Although this is a hypothetical case and the maximum applied voltage and minimum safe operating voltage will vary with type of equipment, the voltage rating of equipment, safety factor desired, etc., the preventive maintenance procedure will be similar.

The apparatus as above described and illustrated is contingent, in its operation, on the ionization voltage level of the dielectric material which decreases after long periods of natural aging, or of accelerated aging caused by overloads, such as overheating, on electrical equipment.

This application is a continuation-in-part of my co-pending prior application for patent, Serial No. 708,054, filed January 9, 1958, and now abandoned.

It will be understood that various changes in the steps, details, and arrangements of parts, which have been herein described and illustrated in order to explain the nature of the invention, may be made by those skilled in the art within the principle and scope of the invention as expressed in the appended claims.

I claim:

1. Apparatus for determining the condition of electrical insulation without damage to the insulation and where the insulation may be installed and only partially accessible for testing, which comprises power supply means for connection to said insulation and apply a direct voltage across said insulation and an initial voltage high enough to cause a small initial leakage current through such insulation but which initial voltage is well below the ionization voltage of such insulation, and adjustable to increase the applied voltage progressively through small uniform units of increase and cause increases in said leakage current, a voltmeter connected across said insulation and having a voltage indicating element that indicates the direct voltage applied across said insulation, multi-range current measuring means connected in series with said insulation and said power supply means and having an indicating member that indicates the leakage current passing through said insulation, a limit switch activated by said current indicating member at a selected position in the travel of that member, means activated by operation of said limit switch for interrupting the application of said direct voltage to said insulation, said current measuring means having its indicating member adjustable to set it, while indicating a small leakage current, to a position along its possible path of travel to said limit switch which represents approximately that fraction of the initial part of said path to its indicating position for said initial leakage current which corresponds to the fraction of the path of said indicating element from its zero position to the maximum desired position along its path representing maximum voltage to be applied.

2. The apparatus according to claim 1, and means activated by said interrupting means for draining off any retained potential from said insulation concurrently with the interruption of said voltage application to said insulation.

3. Apparatus for determining the condition of electrical insulation without damage to the insulation, which is applicable while the insulation is installed with at least a portion of it inaccessible for testing, which comprises a source of high D.C. variable voltages, a circuit for connecting said source in series with said insulation for placing progressively increasing high D.C. voltages across said insulation, a current measuring device in series in said circuit for measuring any leakage current through said insulation that may be caused by said applied voltages and having a limit switch activated when the measured current reaches a selected value, a voltmeter, having a linear scale and a voltage indicator, connected across said insulation and indicating the voltages applied to the insulation, and means activated by said limit switch when the latter is activated for interrupting the application of voltages from said source to said insulation.

4. The apparatus according to claim 3, and means operated concurrently with said means that is activated by said limit switch for draining from said insulation any potential across it that remains following said interruption of the application of high voltage across said insulation.

5. The apparatus according to claim 3, wherein said leakage current measuring means has a scale, and a movable current indicator operating over said scale, which current indicator is selectively adjustable while it is measuring leakage current to any intermediate position over said scale, whereby when a small leakage current is being measured, the current indicated can be adjusted to a position over its scale which represents that fraction of its possible movement over its scale from zero to activation of the limit switch, which corresponds to the fraction of the possible movement of the voltage indicator over its scale which the voltage indicator occupies at that same time.

6. The apparatus according to claim 5, wherein said current measuring means is a twin triode vacuum tube type of ammeter, with a variable set potentiometer that by adjustment varies the sensitivity of current measurement and varies the relative position of the current indicator over its scale for any particular leakage current.

References Cited in the file of this patent

UNITED STATES PATENTS

| | | |
|---|---|---|
| 1,212,467 | Evershed | Jan. 16, 1917 |
| 2,166,932 | Keinath | July 25, 1939 |
| 2,724,087 | Hand | Nov. 15, 1955 |
| 2,932,791 | Carrington | Apr. 12, 1961 |

OTHER REFERENCES

Herborn: "Detecting Momentary Failures in Capacitors," Bell Laboratories Record, January 1951, pages 12–13.

Anderson: "Detecting Voids in Insulating Tape," Electronics, January 1954, pages 136–140.